Dec. 10, 1963 C. E. LAY 3,113,642
RESILIENT BUMPER BLOCK
Filed March 2, 1962

INVENTOR.
CARLTON E. LAY
BY Hamilton & Cook
ATTORNEYS

United States Patent Office 3,113,642
Patented Dec. 10, 1963

3,113,642
RESILIENT BUMPER BLOCK
Carlton E. Lay, 2617 Robindale Ave., Akron, Ohio
Filed Mar. 2, 1962, Ser. No. 176,949
5 Claims. (Cl. 188—32)

The present invention relates to bumper blocks. More particularly, the present invention relates to bumper blocks which are particularly suitable for defining the parking area for motor vehicles and which will serve as chocks for the wheels of vehicles parked thereagainst.

The current trend toward public convenience as a stimulus to the successful merchandising of commodities, and even entertainment, has initiated the provision of sufficient parking areas in proximity to retail stores, bowling alleys, theaters and the like. The suburban shopping center is an especially vivid example of this.

A store, or group of stores, purchases a large block of land in the suburbs and allocates 30% of the available space for buildings and the remaining 70% for parking. In order to provide an orderly arrangement for the parking area, it must be laid out with defined locations for parking the individual vehicles alternating with lanes for moving vehicles. Merely striping the area with painted lines has proven to be extremely unsatisfactory because people invariably pay little or no attention to these guides. To provide a more tangible definition of parking and moving areas it has been found desirable to use an object which physically protrudes from the surface of the parking area: i.e., bumper blocks.

In some situations the asphalt, or blacktop, surface material of the pavement has been molded to provide permanent bumper blocks against which wheels of the parked vehicle can rest. This method satisfactorily divides the parking area into parking and moving lanes, but it is tedious and expensive to mold the asphalt into bumpers, and such bumpers are subject to unsightly permanent deformation, should a vehicle be accidentally driven across the bumper.

Other prior art bumper blocks have been pre-cast from concrete, allowed to cure and then installed in the proper location by driving steel rods into the ground through the fastening holes in the concrete bumpers. These bumpers are extremely heavy and accordingly difficult to install. Furthermore, unless they are installed upon an absolutely flat surface, they readily crack in the event a vehicle accidentally passes over them. Similarly, temperature variation and the repeated stress imposed as wheels roll against them to stop combine to spall away the concrete at the fastening holes. Moreover, the protrusion and rigidity of these prior art bumper blocks tends to block free passage of the vehicle transversely thereacross in either direction. Thus, if, in parking a car, the driver approaches the block too fast and the momentum of the car carries it over the bumper block, to return the wheels to the proper side the driver must apply sufficient power to cause the wheels to climb the bumper as well as move in a reverse direction. This creates a potentially hazardous situation.

It is therefore an object of the present invention to provide an improved bumper block for parking areas which is of a protrusion type.

It is a further object of the present invention to provide an improved bumper block which rigidly opposes passage of a wheel therecross in one direction but which permits relatively unobstructed passage thereacross in a reverse direction.

It is a still further object of the present invention to provide an improved bumper block which is light in weight, easily and inexpensively manufactured and easily and inexpensively installed.

It is a still further object of the present invention to provide an improved bumper block which is unaffected by wide extremes or variations in temperature.

It is a still further object of the present invention to provide an improved bumper block which can be easily and securely fastened to the surface of the parking area and as easily removed if so desired.

These and other objects which will become apparent from the following specification are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

An improved bumper block according to the invention is fabricated as by extrusion from a deformable, resilient rubber compound or suitable plastic material such as polypropylene or high density polyethylene. The bumper block, indicated generally by the numeral 10 is most economically manufactured in long lengths and cut into sections of desired length. The bumper block 10 is generally triangular in cross-section. The base of the block has sufficient width for secure attachment by a suitable adhesive to the pavement. The base intersects a rear or vertical wall and a front sloping or inclined wall. The apex of the front and rear walls is blunt or rounded rather than sharp or pointed.

The front wall which is intended to contact the wheels of a parking car, is strengthened by two integrally formed spaced-apart parallel ribs extending perpendicular from the front wall to the rear wall. The parallel ribs provide maximum resistance to deformation by vehicle wheels engaging or contacting the front wall while providing minimum resistance to deformation by a vehicle wheel passing over the block from rear to front.

Figure 1:
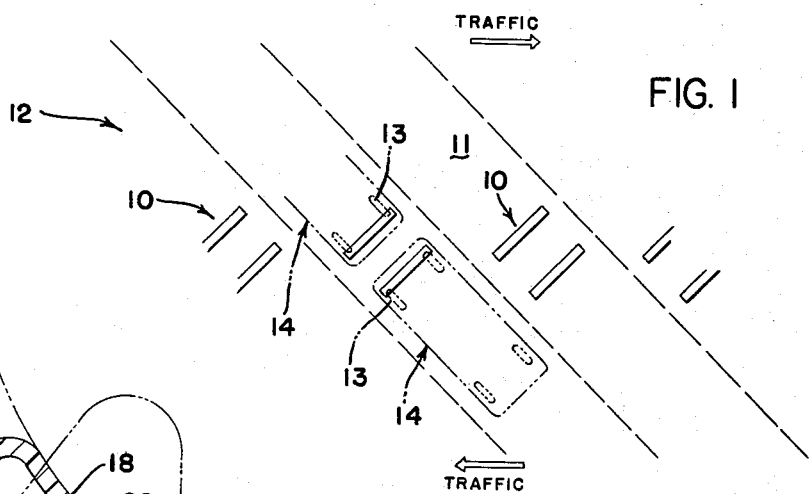
FIG. 1 is a plan view of a segment of a typical parking area utilizing bumper blocks according to the present invention.

As shown in FIG. 1 the improved bumper blocks 10 may be placed on the pavement 11 of a parking area 12 in opposed pairs to provide stops for contacting the wheels 13 of vehicles 14. Proper placement of such bumper blocks 10 will usually indicate which portions of the parking area 12 are to be used for actually parking the vehicle and which are to be used for moving traffic.

Figure 2:
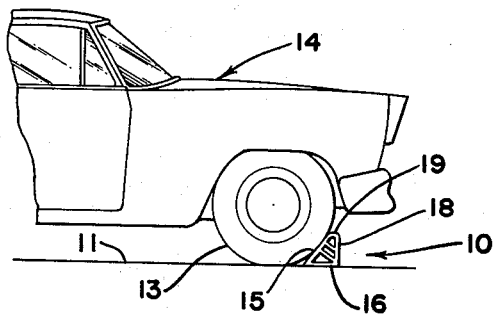
FIG. 2 is a side elevation of the front portion of a parking car, the front wheels of which are engaging the front wall of a bumper block.
Figure 3:
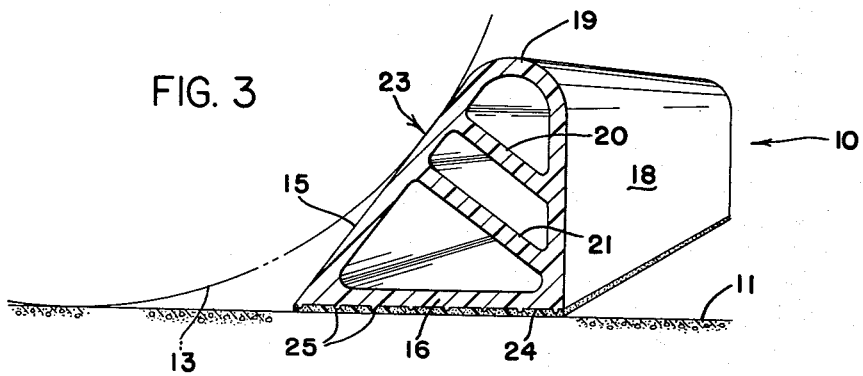
FIG. 3 is an enlarged area of FIG. 2 shown in perspective.

As best shown in FIGS. 2 and 3, each bumper block 10 is located so that the wheel 13 of the parked vehicle 14 engages the inclined front wall 15 which extends angularly upwardly from the wide base 16. The opposed bumper blocks are located sufficiently apart from each other so the two facing cars would not collide when the wheels are against the opposed bumpers.

Figure 4:
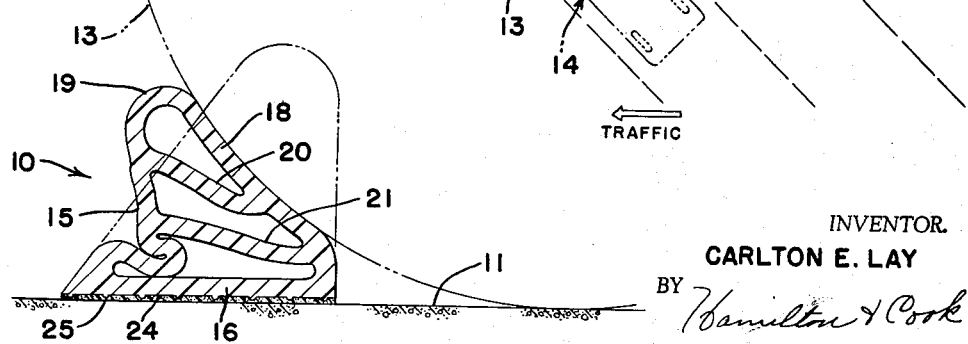
FIG. 4 is a side elevation of the improved bumper block illustrating permitted deformation when a vehicle wheel passes over from rear to front.

The rear wall 18 also extends upwardly from base 16 and is joined at its uppermost extremity to the abutting wall 15, as by the rounded cap portion 19. Interiorly of the bumper block 10, longitudinally oriented strengthening ribs 20 and 21 are provided to give increased structure rigidity to the front wall 15. By placing these structural ribs 20 and 21 perpendicular to the abutting wall 15 in proximity to the area where a wheel would contact the abutting wall, that wall is provided with the maximum resistance against deformation by a wheel abutting thereagainst, and thus affords an excellent chocking effect to the wheel. The downward and rearward disposition of the strengthening ribs 20 and 21 accomplished by positioning them perpendicularly to the angularly inclined front wall 15, while affording the required strength to the front wall, also provides the minimum resistance to deformation of the rear wall 18. Thus, if it becomes necessary to drive the wheel 13 of vehicle over the bumper block 10 from the rear side thereof, as for example, in a situation where an automobile approaches the bumper block too fast to stop and the front wheels accidentally passed over the bumper block, the bumper block will temporarily deform as the wheel 13 is brought into engagement with rear wall 18, as shown in FIG. 4.

To provide the greatest strength to the front wall 15, it has been found desirable to position one strengthening rib on each side of the point 23 where the wheel 13 contacts the front wall 15. As shown, strengthening rib 20 extends perpendicularly from the front wall 15 above the contact point 23 and strengthening rib 21 extends perpendicularly from the front wall 15 below the contact point 23.

Whether the rearmost ends of the strengthening ribs 20 and 21 join the base 16 or the rear wall 18, as shown, depends upon the desired or selected angular inclination of the front wall 15 together with the width of the base 16. For best results, it has been found that front wall 15 should be inclined at approximately 50° to 60° with respect to the base 16 and the base should be sufficiently narrow to permit both ribs 20 and 21 to join the backwall 18.

In view of the foregoing description it should be apparent that the cross section of the improved bumper block according to the present invention is particularly suitable to be manufactured by an extrusion process. Accordingly, the undersurface 24 of the base 16 can be provided with ribs or striations 25 longitudinally of the extruded length. These ribs 25 are particularly desirable for providing a non-smooth surface so that the bumper block can be secured in position on the surface of a parking lot by a suitable adhesive.

It is therefore apparent that a bumper block constructed according to the concept herein disclosed accomplishes the objects of the invention.

What is claimed is:

1. An improved bumper block of resilient material having a base, an angularly inclined front wall adapted to be engaged by the wheel of a vehicle parked thereagainst, a rear wall, said base, front and rear walls being joined together, two strengthening ribs interiorly of said bumper block and integrally formed therewith extending perpendicularly from said front wall and joined thereto, one of said strengthening ribs joined to said front wall above the point where a wheel would engage said front wall, the other of said strengthening ribs joined to said front wall below the point where a wheel would engage said front wall.

2. An improved bumper block of resilient material having a base, an angularly inclined front wall adapted to be engaged by the wheel of a vehicle parked thereagainst, said front wall inclined at approximately 50° to 60° with respect to said base, a rear wall, said base, front and rear walls being joined together, two strengthening ribs interiorly of said bumper block and integrally formed therewith extending perpendicularly from said front wall and joined thereto, one of said strengthening ribs joined to said front wall above the point where a wheel would engage said front wall, the other of said strengthening ribs joined to said front wall below the point where a wheel would engage said front wall.

3. A resilient bumper block of triangular cross section having a base, a front wall inclined at approximately 50° to 60° with respect to said base, a rear wall, said base, front and rear walls being joined together, two strengthening ribs interiorly of said bumper block extending perpendicularly from said front wall and joined thereto, one of said strengthening ribs joined to said front wall above the point where a wheel would contact said front wall, the other of said strengthening ribs joined to said front wall below the point where a wheel would contact said front wall, the other end of said strengthening ribs joined to said rear wall.

4. A resilient bumper block of triangular cross section having a base, a front wall inclined at approximately 50° to 60° with respect to said base, a rear wall, said rear wall extending perpendicularly upward from said base, said base, front and rear walls being joined together, two strengthening ribs interiorly of said bumper block extending perpendicularly from said front wall and joined thereto, one of said strengthening ribs joined to said front wall above the point where a wheel would contact said front wall, the other of said strengthening ribs joined to said front wall below the point where a wheel would contact said front wall, the other end of said strengthening ribs joined to said rear wall.

5. A resilient bumper block of right triangular cross section having a base, the under surface of said base having ribs, a front wall inclined at approximately 50° to 60° with respect to said base, a rear wall, said rear wall extending perpendicularly upward from said base, said base, front and rear walls being joined together, two strengthening ribs interiorly of said bumper block extending perpendicularly from said front wall and joined thereto, one of said strengthening ribs joined to said front wall above the point where a wheel would contact said front wall, the other of said strengthening ribs joined to said front wall below the point where a wheel would contact said front wall, the other end of said strengthening ribs joined to said rear wall.

References Cited in the file of this patent

UNITED STATES PATENTS

| | | |
|---|---|---|
| 213,203 | Jewell | Mar. 11, 1879 |
| 1,174,410 | Hajasok | Mar. 7, 1916 |
| 1,893,580 | Colley | Jan. 10, 1933 |
| 2,189,323 | Noonan | Feb. 6, 1940 |
| 2,208,080 | Overdorff | July 16, 1940 |